_Patented May 15, 1951_

2,553,047

UNITED STATES PATENT OFFICE 2,553,047

WATER-SOLUBLE DYESTUFFS OF THE NAPHTHOQUINONE-IMINE SERIES AND A PROCESS OF MAKING SAME

Valentin Kartaschoff, Basel, Switzerland, assignor to Sandoz Limited, Basel, Switzerland, a Swiss firm No Drawing. Application June 22, 1948, Serial No. 34,554. In Switzerland July 15, 1947

12 Claims. (Cl. 260—396)

The present invention relates to the manufacture of new water-soluble dyestuffs of the naphthoquinone-imine series and to a process for the manufacture of the same.

It has been found that new water-soluble dyestuffs of the naphthoquinone-imine series may be produced by condensing halogenated aminohydroxy- or dihydroxy-naphthoquinone-imines or their leuco compounds with aromatic amines which contain at least one water-solubilizing group, but may contain still further substituents.

The halogenated naphthoquinone-imines used in the present process correspond to the general formula

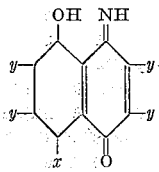

wherein $x$ stands for an amino or hydroxy group and at least one of the $y$'s stands for a halogen atom, the other $y$'s being hydrogen. The said naphthoquinone-imines can be prepared according to the processes described in applicant's copending application Ser. No. 729,401, filed February 18, 1947, now abandoned and Ser. No. 34,553, filed June 22, 1948, now Patent No. 2,538,005.

As aromatic amino compounds there are preferably used the sulphonic and carboxylic acids of the benzene and naphthalene series that may contain further substituents. The condensation of the naphthoquinone derivatives with the aromatic amino compounds is preferably carried out in water in the presence of a solvent, such as an alcohol, and in the presence of acid binding agents and at an elevated temperature. In the case where the starting products are used in leuco- or hydro-form the condensation will be carried out in an inert atmosphere and the condensation products thus obtained will be subsequently oxidised, for example by means of an air stream, preferably in the presence of a base, such as pyridine, piperidine, ethanolamine or the like.

The condensation products obtained according to the present process are soluble in water with a red, violet to blue coloration, and dye animal fibres in violet-blue to grey shades. The dyeings thus obtained can be after-chromed or after-coppered. Some of the new dyestuffs can be dyed by the so-called meta-chrome-dyeing process. The dyeings obtained with the new dyestuffs possess generally good wet properties and are stable to the carbonisation treatment.

The following examples illustrate how the invention can be carried out in practice, but are by no means limitative.

Example 1

12 grams of sulphanilic acid (78.5%) are dissolved in 80 grams of water with the addition of 10 grams of sodium carbonate. To this solution are added 20 grams of sodium acetate and 160 grams of isopropyl alcohol. To this mixture are added with good stirring at room temperature 17.2 grams of a finely powdered brominated naphthoquinone-imine derivative containing 44.6% of bromine and 7.9% of nitrogen and corresponding to formula 1, hereafter set forth. The homogeneous mixture is then heated to boiling under reflux for 16 hours. After this time a test taken out shows that the reaction product has become soluble in water. The isopropyl alcohol is then distilled off, the reaction mixture diluted with 250 grams of water, filtered at 80° C. from some insoluble impurities, and the dyestuff salted out. A dark powder soluble in water with a deep blue coloration is obtained.

Example 2

A homogeneous mixture consisting of 240 grams of water, 30 grams of soda, 39 grams of J-acid (93.2%), 60 grams of sodium acetate, 480 grams of isopropyl alcohol and 51.6 grams of the naphthoquinone-imine derivative used in Example 1 is heated under reflux with good stirring for 20 hours at 80° C. After this time the isopropyl alcohol is distilled off, the charge diluted to 1000 cc. and treated with soda until alkaline to Brilliant Yellow paper. The solution thus obtained is filtered while still hot and the dyestuff salted out. It is soluble in water with a blue coloration.

In place of the J-acid in Example 2 and of the sulfanilic acid in the Example 1, other water-soluble aromatic amino compounds can be used. The effects produced by dyeing wool with the respective condensation products obtained with the same 3,7-dibromo-5-amino-8-hydroxy-1,4-naphthoquinone-imine-(1) can be seen in the following table:

| Aromatic Amino Compound | Shade | | |
|---|---|---|---|
| | Acid | After-chromed | Meta-chromed |
| sulphanilic acid | grey-blue | grey | grey. |
| p-aminosalicylic acid | reddish-blue | reddish-grey | bluish-grey. |
| 2-amino-1-phenol-4-sulphonic acid | dull violet | neutral grey | grey. |
| 2-amino-1-phenol-4-sulpho-3-carboxylic acid | blue | grey | Do. |
| 4-amino-6-sulphosalicylic acid | do | grey-blue | grey-blue. |
| dehydrothiotoluidine-sulphonic acid | greenish grey | grey | grey. |
| 1,6- and 1,7-naphthylamine-sulphonic acid | grey-blue | do | Do. |
| 1,8-naphthylamine-sulphonic acid | do | do | Do. |
| 1,5-naphthylamine-sulphonic acid | do | do | Do. |
| 2,6-naphthylamine-sulphonic acid | do | do | Do. |
| 1-amino-2-naphthol-4-sulphonic acid | reddish-blue | brown-grey | Do. |
| 1-amino-8-naphthol-4-sulphonic acid | violet | bluish grey | Do. |
| 2-amino-5-naphthol-7-sulphonic acid | reddish-blue | reddish-grey | Do. |
| 2-amino-8-naphthol-6-sulphonic acid | do | grey | bluish grey. |
| 1-amino-8-naphthol-3,6-disulphonic acid | blue | do | Do. |
| 2-amino-8-naphthol-3,6-disulphonic acid | do | greenish grey | Do. |

*Example 3*

13 grams of J-acid (47% paste) are dissolved in 40 grams of water with addition of 5 grams of sodium carbonate. To this solution are added 10 grams of sodium acetate, 80 grams of isopropyl alcohol and 8.6 grams of a halogenated naphthoquinone-imine containing 48.5% of bromine and 3.65% of nitrogen and corresponding to formula 2, hereinafter set forth. The charge is then heated with good stirring for 20 hours under reflux at 80° C. After isolation of the dyestuff in the manner described in the above Example 1 it is soluble in water with a red-violet coloration. It dyes wool in violet shades which become reddish-grey on after-chroming. When dyed according to the metachrome process it gives grey shades.

As starting product, i. e. halogenated naphthoquinone-imines, that can be used for the manufacture of the new water-soluble dyestuffs, in place of the halogenated naphthoquinone-imines of the formulas 1 and 2 employed in Examples 1, 2 and 3:

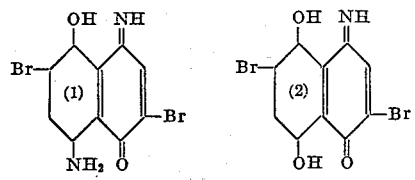

the following ones may be used:

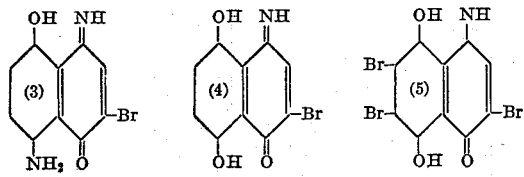

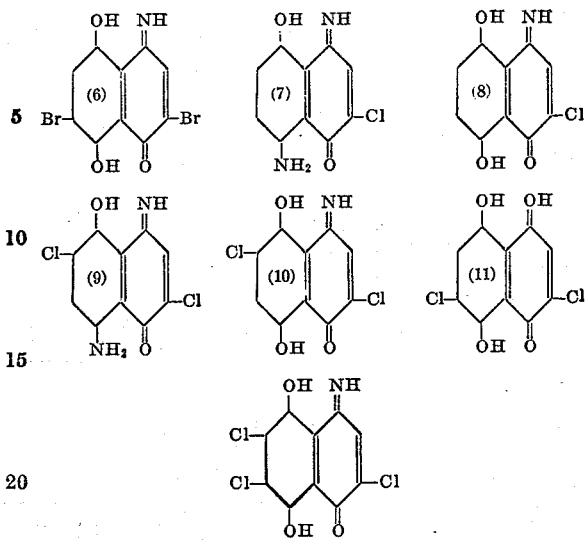

What I claim is:

1. A process for the manufacture of new water-soluble dyestuffs of the naphthoquinone-imine series comprising the step of heating a halogenated naphthoquinone-imine of the general formula

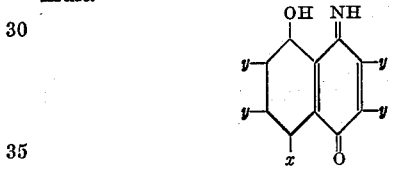

wherein $x$ stands for a substituent selected from the group consisting of amino and hydroxy groups and wherein at least one $y$ stands for halogen, the other $y$'s being hydrogen, with a water-soluble aromatic amine in presence of a diluent and an acid binding agent.

2. A process for the manufacture of new water-soluble dyestuffs of the naphthoquinone-imine series comprising the step of heating a halogenated naphthoquinone-imine of the general formula

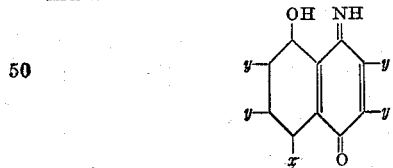

wherein $x$ stands for a substituent selected from the group consisting of amino and hydroxy groups and wherein two of the $y$'s stand for halogen, the other two $y$'s being hydrogen, with a water-soluble aromatic amine in presence of a diluent and an acid binding agent.

3. A process for the manufacture of new water-soluble dyestuffs of the naphthoquinone-imine series comprising the step of heating a halogenated naphthoquinone-imine of the general formula

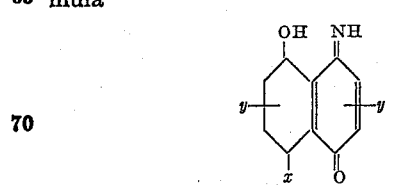

wherein $x$ stands for a substituent selected from the group consisting of amino and hydroxy groups and wherein each *y* stands for halogen, with a water-soluble aromatic amine in presence of a diluent and an acid binding agent.

4. A process for the manufacture of new water-soluble dyestuffs of the naphthoquinone-imine series comprising the step of heating a halogenated naphthoquinone-imine of the general formula

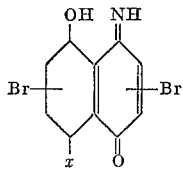

wherein *x* stands for a substituent selected from the group consisting of amino and hydroxy groups, with a water-soluble aromatic amine in presence of a diluent and an acid binding agent.

5. A process for the manufacture of new water-soluble dyestuffs of the naphthoquinone-imine series comprising the step of heating a halogenated naphthoquinone-imine of the formula

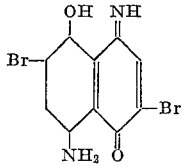

with an equimolecular quantity of a water-soluble aromatic amine in the presence of a diluent and an acid binding agent.

6. The process for the manufacture of a new water-soluble dyestuff of the naphthoquinone-imine series, comprising the step of heating the halogenated naphthoquinone-imine of the formula

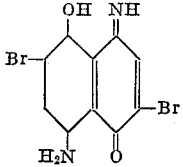

with an equimolecular quantity of 1 - amino-naphthalene-8-sulphonic acid in the presence of a diluent and an acid binding agent.

7. The process for the manufacture of a new water-soluble dyestuff of the naphthoquinone-imine series, comprising the step of heating the halogenated naphthoquinone-imine of the formula

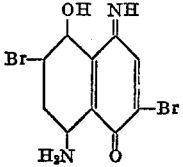

with an equimolecular quantity of 2-amino-8-hydroxy-naphthalene-6-sulphonic acid in the presence of a diluent and an acid binding agent.

8. The process for the manufacture of a new water-soluble dyestuff of the naphthoquinone-imine series, comprising the step of heating the halogenated naphthoquinoneimine of the formula

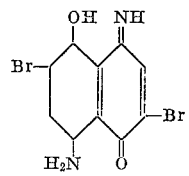

with an equimolecular quantity of 1-amino-8-hydroxy-naphthalene-3,6-disulphonic acid in the presence of a diluent and an acid binding agent.

9. A compound corresponding to the formula

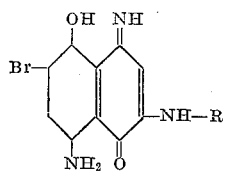

wherein —NH—R stands for the radical of a water-soluble aromatic amine.

10. The compound of the formula

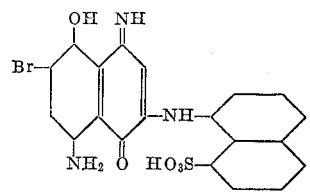

11. The compound of the formula

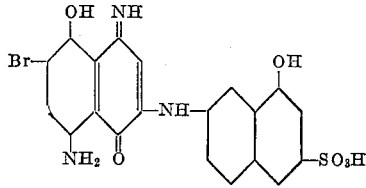

12. The compound of the formula

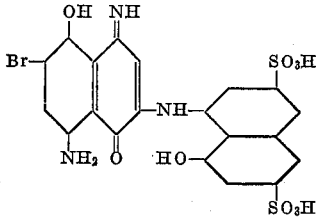

VALENTIN KARTASCHOFF.

No references cited.